(12) United States Patent
Harris

(10) Patent No.: US 7,137,308 B2
(45) Date of Patent: Nov. 21, 2006

(54) SLIDING PIPE PLUG

(75) Inventor: Robert J. Harris, Rescue, CA (US)

(73) Assignee: Metrotech Corporation, Santa Clara, CA (US)

( * ) Notice: Subject to any disclaimer, the term of this patent is extended or adjusted under 35 U.S.C. 154(b) by 189 days.

(21) Appl. No.: 10/616,890

(22) Filed: Jul. 9, 2003

(65) Prior Publication Data

US 2005/0005716 A1  Jan. 13, 2005

(51) Int. Cl.
*G01N 29/24*    (2006.01)

(52) U.S. Cl. .................................... 73/865.8

(58) Field of Classification Search .............. 73/865.8, 73/49.5, 40.5 R; 15/88, 104.061, 104.062; 138/89, 90; 324/247, 354, 363
See application file for complete search history.

(56) References Cited

U.S. PATENT DOCUMENTS

| | | | |
|---|---|---|---|
| 2,332,984 A | 10/1943 | Brackeen | |
| 2,975,637 A | 3/1961 | Burdick | 73/304 |
| 3,403,418 A | 10/1968 | Knapp et al. | |
| 3,480,984 A | 12/1969 | Kidd | |
| 3,704,729 A * | 12/1972 | Tomlinson | 138/90 |
| 3,768,304 A | 10/1973 | Hyde | 73/40.5 |
| 3,778,859 A * | 12/1973 | Donnelly | 15/104.31 |
| 4,365,379 A | 12/1982 | Neff | |
| 4,866,978 A * | 9/1989 | Biggerstaff | 73/865.8 |
| 5,155,924 A | 10/1992 | Smith | |
| 5,182,516 A | 1/1993 | Ward et al. | |
| 5,770,800 A * | 6/1998 | Jenkins et al. | 73/623 |
| 5,892,163 A | 4/1999 | Johnson | 73/865.8 |
| 6,082,183 A * | 7/2000 | Huber | 73/49.1 |
| 6,289,935 B1 * | 9/2001 | Tash | 138/97 |
| 6,301,954 B1 * | 10/2001 | Schuberth et al. | 73/40.5 R |
| 6,314,795 B1 | 11/2001 | Ingham | |
| 6,339,953 B1 * | 1/2002 | Ashworth | 73/49.5 |

(Continued)

FOREIGN PATENT DOCUMENTS

| | | |
|---|---|---|
| DE | 4219434 A1 | 12/1993 |
| DE | 19612800 A1 | 2/1997 |

OTHER PUBLICATIONS

Harris, R.J., "Sliding Pipe Plug"—U.S. Appl. No. 10/306,403 filed Nov. 27, 2002 (29 pages).

(Continued)

*Primary Examiner*—Robert Raevis
(74) *Attorney, Agent, or Firm*—Finnegan, Henderson, Farabow, Garrett & Dunner, L.L.P.

(57) ABSTRACT

A sliding pipe plug for working on and testing pipes is presented. The sliding pipe plug includes a center portion and a gasket disposed about the central portion. When towed through the pipe, the sliding pipe plug maintains a substantial seal against water flowing through the pipe. In some embodiments, a flexible gasket can be utilized to allow for substantial sealing while the sliding pipe plug is traversing obstacles in the pipe. The sliding pipe plug according to the present invention can be utilized in pipes where conventional plugs are inconvenient. For example, in FELL testing a sewage line, a sliding pipe plug can be attached to a sonde cable and the testing can proceed without plugging and surcharging all of the section of pipe to be tested. In some embodiments, the sliding pipe plug includes a break-away section that allows the seal against water flowing through the pipe to be broken when the sliding pipe plug is pulled in a direction opposite the towing direction. In some embodiments, the sliding pipe plug includes a centering section that keeps the sliding pipe plug essentially in the center of the pipe.

35 Claims, 13 Drawing Sheets

U.S. PATENT DOCUMENTS 6,380,743 B1    4/2002    Selvog
6,390,118 B1    5/2002    Mankins
6,422,064 B1    7/2002    Pampinella

OTHER PUBLICATIONS

Office Action dated Apr. 16, 2004, in U.S. Appl. No. 10/306,403.
Response to Office Action dated Sep. 24, 2004, in U.S. Appl. No. 10/306,403.
Office Action dated Nov. 26, 2004, in U.S. Appl. No. 10/306,403.
Response to Office Action dated May 24, 2005, in U.S. Appl. No. 10/306,403.
Office Action dated Jun. 7, 2005, in U.S. Appl. No. 10/306,403.

* cited by examiner

SLIDING PIPE PLUG

RELATED APPLICATIONS

The present application is related to U.S. patent application Ser. No. 10/306,403, "Sliding Pipe Plug", to R. J. Harris, assigned to the same assignee as is the present disclosure, herein incorporated by reference in its entirety.

BACKGROUND

1. Field of the Invention

The present invention relates to testing of pipes and, in particular, to a plug system for restricting the water flow through a pipe.

2. Description of Related Art

Pipes that carry water and other liquids are prone to wear and damage. Sewer pipes, for example, may be prone to intrusion by tree roots or damage by ground movement. Testing can be routinely performed on the pipes in order to ascertain if the pipe is damaged and leaking. Additionally, testing may be performed on pipes to locate leaks in order to facilitate repairs.

One method for testing pipes is with the use of a Focused Electrode Leak Locater (FELL) system. The FELL system locates defects by checking the electrical continuity through the walls of a pipe. Most sewer pipes consist of electrically insulating materials; however, a defect in the pipe that leaks sewage or other electrically conductive liquids will also leak electrical current. For a constant applied voltage, the larger the defect in the pipe wall, the greater the electrical current that will pass through it. A FELL test is carried out by pulling an electrode, called a sonde, through the pipe and measuring the variation of electric current flow through the wall of the pipe, then through the ground to an electrode on the surface. The electrode on the surface can be a metal stake driven into the ground. The sonde may be specially constructed such that the electric current only flows through the pipe radially from a narrow band located at the center of the sonde. The sonde may also contain a microprocessor that controls the voltage applied to the sonde, measures the current flow through defects in the pipe wall, records the position of the sonde in the pipe and discloses the data to a user. The resulting data may be displayed as, for example, a trace of current versus sonde position.

A usual requirement of FELL testing is that the pipe be full of water in the immediate vicinity of the sonde to provide electrical contact between the sonde and the pipe wall. At present, this requires that the pipe section to be tested be blocked just outside of an access port or manhole downstream from the test section. Once the section of pipe to be tested is isolated in this fashion, the isolated section is completely filled with water (surcharged), until the upstream end of the crown of the pipe section to be tested is covered with water. This may also involve blocking the upstream end of the test section just above another access port. In some cases, access ports may be separated by several tens of meters, for example 100 m.

Surcharging a pipe can cause backflow into residences and is considered an unwarranted risk by sewer maintenance supervisors. A significant percentage of sewer pipe section cannot be FELL tested using this method to fill the pipe sections with water because they have a high gradient (i.e., deviation from the horizontal) and cannot be fully surcharged because the top of the downstream manhole may be lower than the crown of the pipe at the upstream manhole.

In addition, surcharging the pipe consumes a lot of time, in some instances more than half of the time required to carry out the test.

Presently FELL testing is carried out by stringing a haul line between manholes of the pipe section to be tested, pulling the FELL sonde through the pipe with the haul line from one manhole to the next, filling the test section with water, activating the sonde recording system, pulling the sonde back to the entry manhole while recording the variation of the current flow through the walls of the pipe, and emptying the sewer pipe. From 70% to 90% of the time to carry out a FELL test is occupied stringing the haul line and filling and emptying the sewer.

Another sewer pipe maintenance operation is water jet cleaning. Sewer pipe water jet cleaning is carried out by inserting a hose into a sewer pipe at a manhole and pumping water through the hose at high pressure. The nozzle at the end of the hose produces high pressure jets of water that clean the pipe and propel the hose end through the pipe. The process is usually carried out in the upstream direction between two manholes. Once the nozzle reaches the upstream manhole the hose is retracted from the pipe.

There are further additional operations that are routinely performed on pipes (sewage or otherwise) where blockage of the pipe, at least temporarily, is required. Therefore, there is a need for methods of blocking a pipe in order to perform operations in the pipe in a quick and efficient manner.

SUMMARY

In accordance with the present application, a sliding pipe plug is presented which allows operations to be performed in a pipe without inserting more time consuming plugging mechanisms. Utilizing a sliding pipe plug according to the present invention, the pipe may be leak checked without completely filling a blocked off section. A sliding pipe plug according to the present invention allows a pipe to be filled to the level required for an operation such as FELL testing without completely plugging and filling a section of the pipe. In some embodiments, a sliding pipe plug according to the present invention can allow for operations to be performed in the pipe utilizing equipment for performing other operations. For example, FELL testing utilizing equipment normally utilized for high-pressure cleaning of the pipe can be performed with the sliding pipe plug.

Some embodiments of a sliding pipe plug apparatus according to the present invention can include a central portion; a gasket portion disposed around the central portion to substantially seal against an inside wall of a pipe as the apparatus is being pulled through the pipe in a tow direction; and a break-away section coupled to the central portion opposite the tow direction, the break-away section including a frangible connector such that the break-away section pulls the gasket portion away from the inside wall after sufficient force opposite the tow direction is applied to the break-away section.

Some embodiments of a sliding pipe plug apparatus according to the present invention can include a central portion; a gasket portion disposed around the central portion to substantially seal against an inside wall of a pipe as the apparatus is being pulled through the pipe in a tow direction; and a centralizing section attached to the central portion to essentially maintain the apparatus centered in a pipe while being towed.

A sliding pipe plug according to the present invention includes a central portion and a gasket portion displaced around the central portion wherein the gasket portion substantially seals against the inner wall of the pipe while the sliding pipe plug is towed along the pipe by a tow line. An operation that requires blocking of the pipe can then be performed utilizing the sliding pipe plug. In some embodiments, the central portion can include equipment for performing operations on the pipe. For example, some of the electronic circuitry for performing FELL testing, including the sonde itself, may be included in the central portion of the sliding pipe plug.

In some embodiments of the present invention, the sliding pipe plug includes a centralizing portion and a plug portion. In some embodiments, the centralizing portion includes fins disposed radially about a central axis in order to help keep the sliding pipe plug essentially in the center of a pipe while it is being towed through the pipe.

In some embodiments of the present invention, the sliding pipe plug includes a break-away section. When a force is applied to pull the sliding pipe plug in a direction opposite the tow direction in the pipe, the break-away section operates to pull the gasket away from the inside wall of the pipe.

In some embodiments, the central portion is attached to a cable which can be attached to a measurement device, for example, a sonde of a FELL testing apparatus, by the break-away section. In some embodiments, the central portion can be attached to a high pressure water hose and the sliding pipe plug is towed through the pipe by the high pressure water hose. A measuring device may then be attached to the sliding pipe plug at the break-away section and towed through the pipe along with the sliding pipe plug.

When pulled through the pipe in the tow direction, the sliding pipe plug substantially seals against the inside of the pipe. In some embodiments, water pressure on the upstream side of the gasket portion helps to seal the plug. In some embodiments, a complete seal against the water flow past the plug is not formed. In some embodiments, the gasket is sufficiently flexible to allow the sliding pipe plug to slide past minor obstructions in the pipe such as root intrusions, offset pipe joints and connection misalignments while substantially sealing against the side wall of the pipe. If it becomes necessary to tow the sliding pipe plug opposite the tow direction, the break-away section pulls the gasket away from the inside wall of the pipe to release the water pressure.

In some embodiments, a method of FELL testing a pipe utilizing a sliding pipe plug according to the present invention includes pulling a FELL sonde and cable through the pipe; attaching the sliding pipe plug to the cable such that the sliding pipe plug will substantially seal against the inside wall of the pipe; towing the sliding pipe plug and sonde through the pipe by the cable while measuring the electrical current as a function of sonde location; and breaking the seal between the sliding pipe plug and the inside wall of the pipe if there is need to tow the sliding pipe plug in the opposite direction. In some embodiments, the method further includes maintaining the sliding plug essentially in the center of the pipe with a centralizing section while towing the sliding plug through the pipe.

In some embodiments, a method of pressure cleaning and testing a pipe includes pressure cleaning a pipe with a high-pressure nozzle attached to a high-pressure hose, wherein during the process of cleaning the high pressure hose travels through the pipe; attaching a sliding pipe plug to the high-pressure hose; and towing the sliding pipe plug through the pipe by the high-pressure hose.

In some embodiments, the sonde is attached to a cable which is pulled through the pipe during the test. In some embodiments, the sonde is attached to a cable which is integrally formed with the pressure hose. In some embodiments, a sonde may be incorporated into the center portion of the sliding pipe plug. In some embodiments, a winch attached to the sonde cable is equipped with a breaking mechanism to help control the velocity of the sliding pipe plug as it traverses the pipe.

These and other embodiments are further described below with respect to the following figures.

In the figures, elements having the same designation have the same or similar function.

DETAILED DESCRIPTION

Figure 1A:
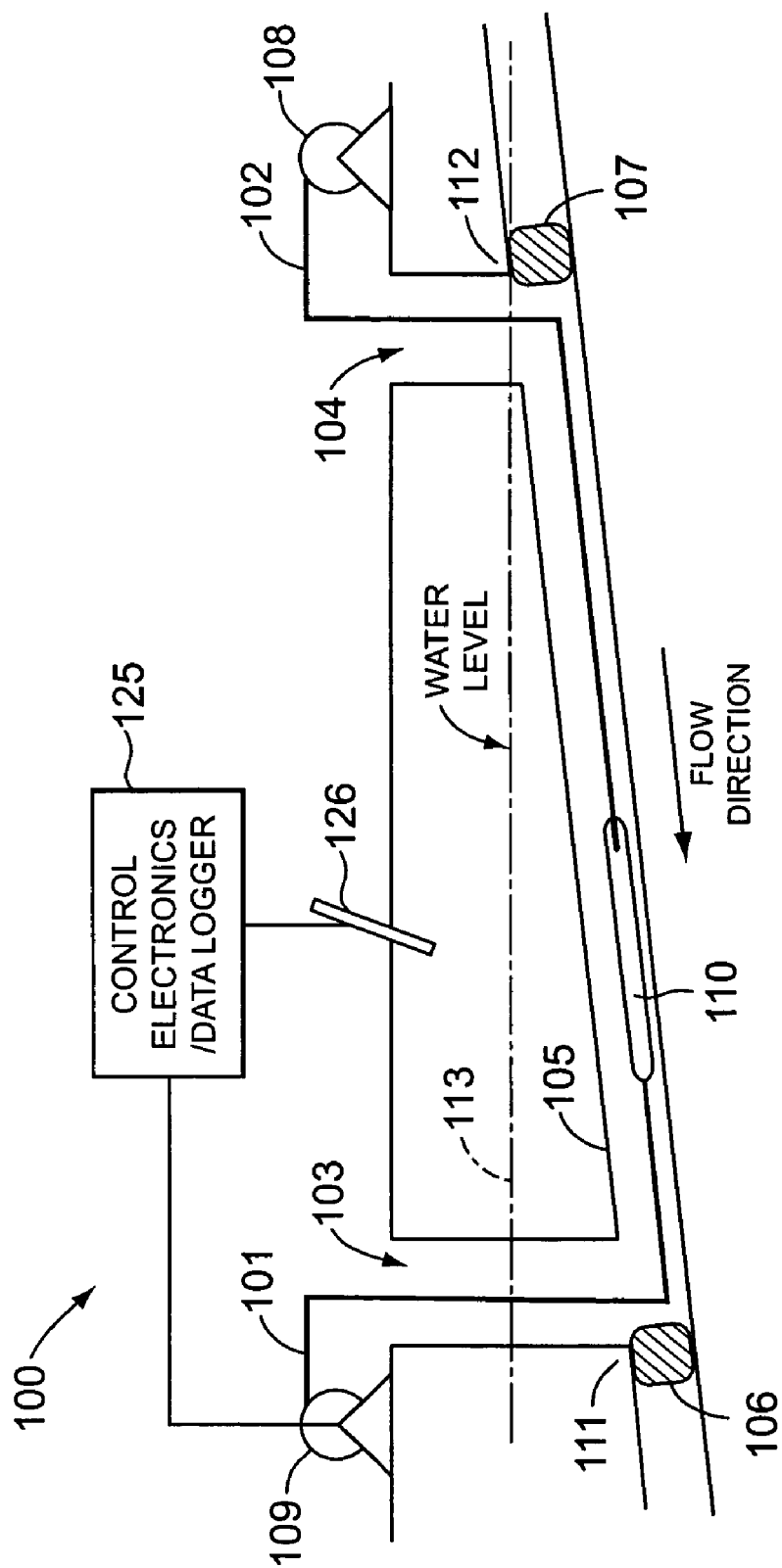
FIGS. 1A, 1B, and 1C illustrate FELL testing of a pipe.

FIG. 1A illustrates a present system 100 for FELL testing of a pipe section 105. Section 105 is obstructed with pipe block 106 adjacent to access 103. The pipe block 106 is on the opposite side of joint 111 from the pipe section to be tested. Another pipe block 107 outside of joint 112 to access 104 may also be blocked. Haul line 102 is inserted into pipe section 105 via access 104. Haul line 102 hauls sonde 110 and cable 101 through pipe section 105 to access 104. Haul line 102 may be hauled using winch 108 in order to pull sonde 110 to the test start position adjacent to access 104. Pipe section 105 is filled with water to a level 113 which keeps pipe section 105 flooded. Sonde 110 is pulled back through the pipe section 105 by cable 101 on winch 109. Typically, sonde 110 is towed through pipe section 105 at a constant rate of about 30 ft/minute (10 m/minute), which optimizes the data acquisition process. Control electronics 125 controls winch 109 and voltage on sonde 110. Control electronics 125 also monitors the current between sonde 110 and ground rod 126 and displays a plot of current versus position. After sonde 110 has traversed pipe section 105, pipe blocks 106 and 107 are removed and the pipe is emptied.

Figure 1B:
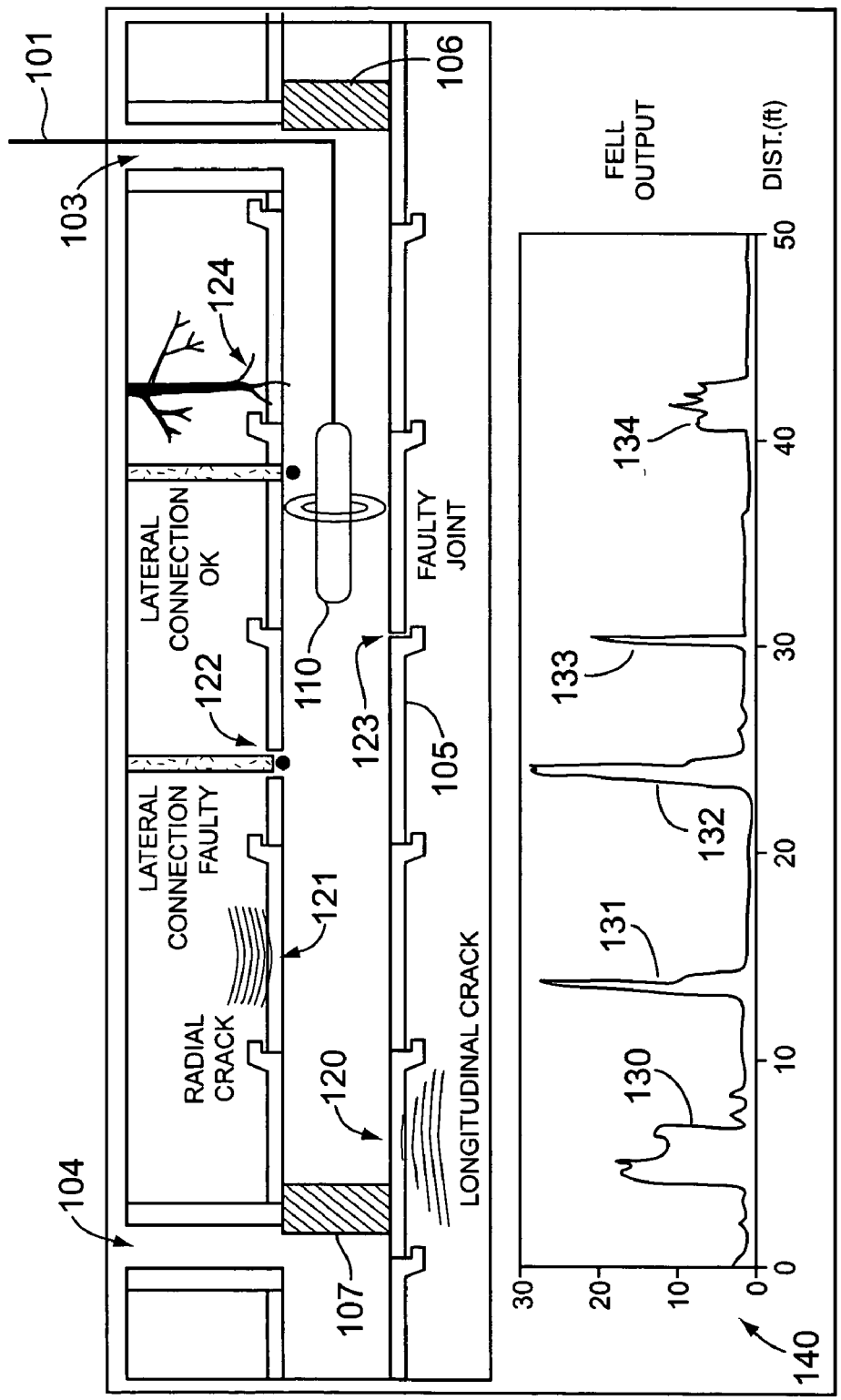

FIG. 1B illustrates a representation of a pipe section 105 and FELL test output display 140. Sonde 110 is pulled through pipe section 105 by cable 101. Pipe section 105 is blocked off by plugs 106 and 107 as described in FIG. 1A. Prior to the blocking of access 103 from pipe section 105, sonde 110 and cable 101 were pulled through access 104 and pipe section 105 by a haul line 102 as illustrated in FIG. 1A. After the removal of haul line 102, plug 107 can be inserted and pipe section 105 is surcharged with water to cover sonde 110 as sonde 110 is towed through pipe section 105.

FIG. 1B illustrates the effects of several types of defects on the flow of electrical current through the pipe wall and the electrical current through sonde 110 as displayed by control electronics 125 (FIG. 1A). In FIG. 1B, defect 120 is a longitudinal crack, defect 121 is a radial crack, defect 122 is a lateral connection fault, defect 123 is a faulty joint, and defect 124 is a root incursion. Although other types of defects may be present in section 105, illustrated defects 120, 121, 122, 123 and 124 are some of the more common defects found in underground pipes such as sewage pipes. As illustrated in FIG. 1B, as sonde 110 traverses defects 120, 121, 122, 123, and 124, FELL control electronics 125 registers the defects as corresponding data signals 130, 131, 132, 133, and 134, respectively.

Figure 1C:
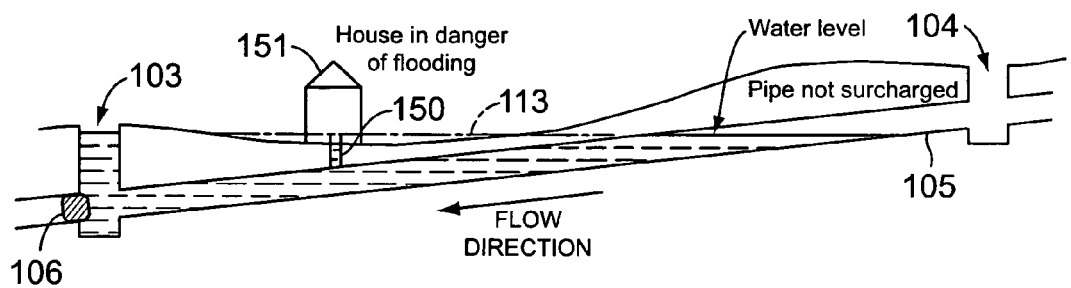
Figure 1D:
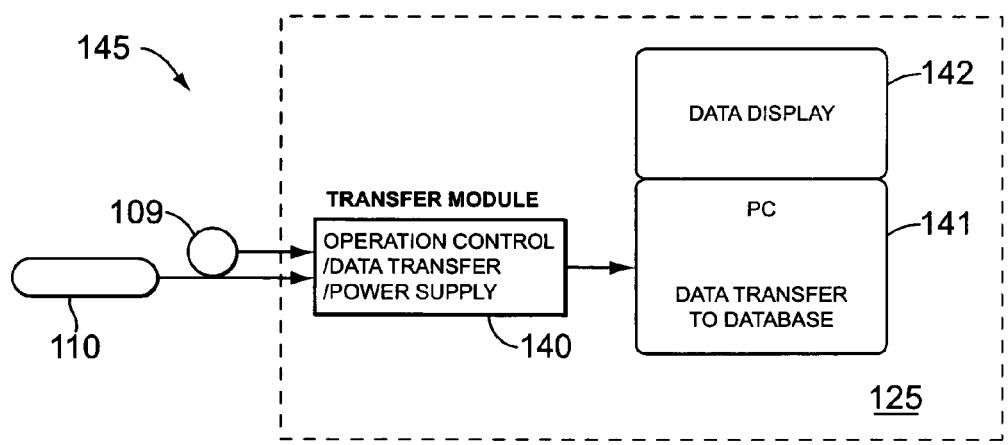
FIG. 1D shows a block diagram of a FELL testing apparatus according to aspects of the present invention.

FIG. 1D shows a block diagram of some embodiments of a FELL system 145. As also shown in FIG. 1A, FELL system 145 includes sonde 110 and control electronics 125. Control electronics 125 is coupled to receive data signals from sonde 110 and from winch 109. Data signals include electrode currents (both focussed and total) from sonde 110 and positional data (e.g., the length of cable 101) from winch 109. In some embodiments, control electronics 125 further receives temperature data from sonde 110. In some embodiments according to the present invention, control electronics 125 may also receive pressure data from sonde 110. Control electronics 125 stores the data and displays data (e.g., current versus position) on a graphics device such as a video display.

As shown in FIG. 1D, control electronics 125 can include a transfer module 140 and a computer system 141. Computer system 141 can be, for example, a personal computer with hard drive, removable storage, and user interfaces. Computer system 141 includes display 142 that can be utilized to display data and operating information to a user. Transfer module 140 receives, digitizes, processes and transmits the data signals. The digitized data signals can be transmitted to computer 141 digitally, for example through a standard RS 232 interface.

Portions of transfer module 140 can be included in sonde 110. For example, in some embodiments sonde 110 includes analog drivers so that analog data is transmitted through cable 101 to transfer module 140, which digitizes and stores the data. The data can then be transferred to computer 141 at a later time. An example of this arrangement is embodied in the FELL-21 system. The FELL-21 system is available from Metrotech Corp., 488 Tasman Drive, Sunnyvale, Calif. 94089.

In some embodiments, part of transfer module 140 is housed in sonde 110 and data from sonde 110 is digitally transmitted through cable 101 to transfer module 140 where it is combined with the positional data from winch 109. Again, the digitized data signals can be transmitted to computer 141 through a standard RS 232 interface. An example of this arrangement is embodied in the FELL-41 system. The FELL-41 system is also available from Metrotech Corp., 488 Tasman Drive, Sunnyvale, Calif. 94089.

Both the FELL-21 and FELL-41 systems described above are examples of testing equipment only. Other testing equipment for performing other tests can also be utilized with sliding pipe plugs according to the present invention. Further, in accordance with aspects of the present invention, both the FELL-21 and FELL-41 system can be modified to include a pressure transducer. Data from the pressure transducer can also be monitored by control electronics 125 as further indication of leaks in pipe section 105. The rate of change of the pressure, for example, can indicate the size of a leak. A suitable low-pressure pressure transducer can be ordered from Frontline Sensor & Systems, 22691 Lambert St, Suite 503, Lake Forest, Calif. 92630. In some embodiments, the pressure transducer can replace a temperature sensor. For example, in the FELL-41 system, the temperature sensor can be replaced with a pressure transducer.

FELL testing of sewage lines is an accurate method of locating various types of defects in the pipe. However, the requirement of plugging the section of pipe to be tested so that the section can be filled with water is difficult and may result in the possibility of a sewage backup. FIG. 1C illustrates the limitations of the nature of traditional Fell testing or other operations that require surcharging pipe section 105. As shown in FIGS. 1A and 1C, pipe section 105 is typically sloped to define a flow direction. In some cases, pipe section 105 and the surface of the ground can be such that a water level 113 which completely fills access 103 does not sufficiently fill pipe section 105. Worse, an access 150 to a structure 151, which can be a residence or other structure, can be such that it falls completely below water level 113, resulting in back-flow of water into structure 151.

Figure 2A:
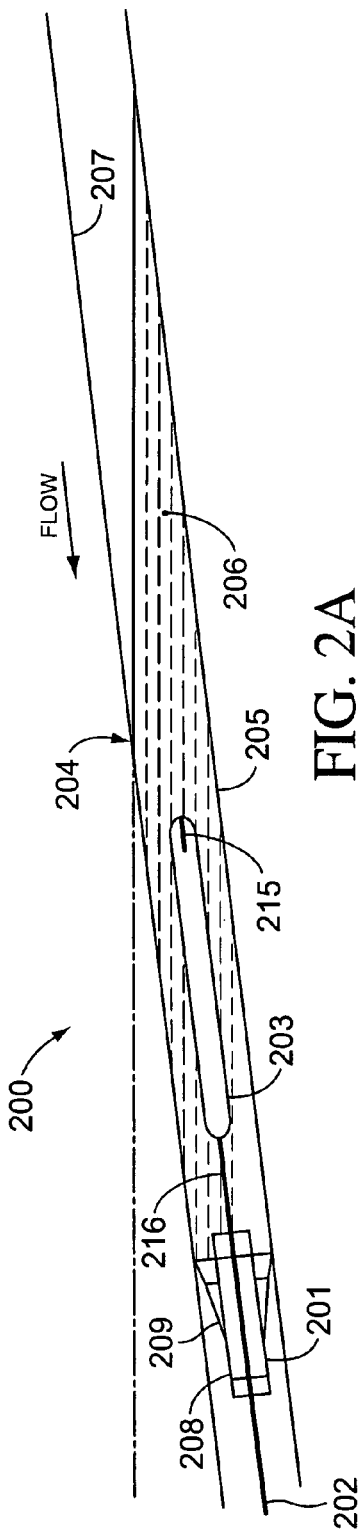
FIGS. 2A and 2B illustrate FELL testing according to embodiments of the present invention.

FIG. 2A illustrates a FELL test method 200 according to some embodiments of the present invention. A portion of pipe section 205 to be FELL tested is shown in FIG. 2A. Pipe section 205 is to be tested using sonde 203. A sliding pipe plug apparatus 201 according to the present invention is attached to sonde cable 202 before sonde 203 is pulled back through pipe section 205 during the FELL test. Gasket 209 of sliding pipe plug apparatus 201 substantially seals against the interior surface 207 of pipe section 205 while sliding pipe plug 201 and sonde 203 are pulled (or towed) through pipe section 205. In some embodiments, sliding pipe plug 201 is placed on cable 202 after the cable has been pulled through pipe section 205 with a haul line (not shown). Water 206 is then retained to a level 204 that allows for coverage of sonde 203. Cable 202 pulls through center section 208 of sliding pipe plug 201. As cable 202 pulls sliding pipe plug 201, sonde 203 is also pulled via cable section 216 which may be part of cable 202. Water level 204 of water 206 moves through pipe section 205 as apparatus 201 is pulled through pipe section 205. FELL testing of the pipe section 205 is thereby performed without the need for filling of the entire pipe section to be tested, as required in system 100 illustrated in FIG. 1A.

In some embodiments of the invention, sonde 203 includes a pressure transducer 215 which can be monitored to insure that sufficient water is present around sonde 203 to perform the FELL test. Further, in some embodiments a signal from pressure transducer 215 may be monitored as a function of the position of sonde 203 so that pressure drops, which can also be used to detect a leak in pipe section 205, can be indicated.

Figure 2B:
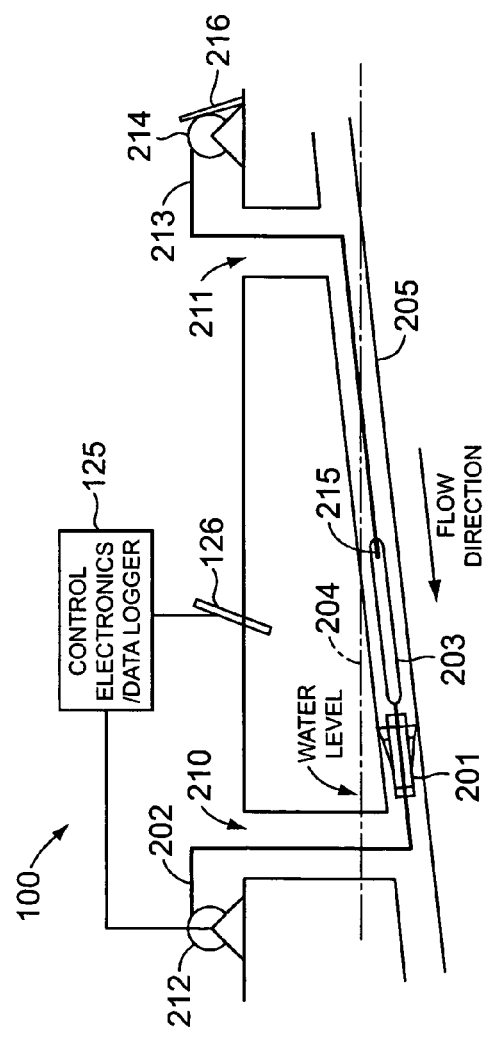

FIG. 2B illustrates an example of FELL testing according to the present invention. The test is performed in section 205 between accesses 210 and 211. A haul line 213, which in some embodiments may be attached to a winch 214, is passed from access 211 through test section 205 to access 210. Sonde 203, which is attached to cable 202, is then pulled from access 210 to access 211 by haul line 213. Apparatus 201 is then attached to cable 201 and the combination of apparatus 201 and sonde 203 is pulled back into section 205 by winch 212. Section 205 is then filled or allowed to fill with sufficient water to cover sonde 203 and the FELL test is performed. Although haul line 213 is shown in FIG. 2B, haul line 213 may, in some cases, be disconnected from sonde 203 as sonde 203 is pulled back during the FELL test in this embodiment. As illustrated and discussed with FIGS. 1A through 1C, control electronics 125 applies voltages to sonde 203, monitors the current through section 205, and in some embodiments monitors pressure transducer 215.

In some embodiments of the invention, haul line 213 remains attached to sonde 203 during the testing process. Winch 214, in some embodiments, is equipped with a brake 216 in order to help control the speed of sonde 203 through section 205. In some cases, water pressure on sliding pipe plug 201 can cause plug 201 to traverse section 205 faster than desired. Further, under those circumstances, cable 202 may become entangled and jammed if sliding pipe plug 201 is traveling faster than cable 202 is being retrieved by winch 212.

Brake 216 may be mechanically, electrically or hydraulically controlled. Brake 216 may include feedback so that a pre-selected tension or a pre-selected cable velocity can be maintained. In some embodiments, brake 216 is a mechanical drum brake within winch 214. However, disk brakes, eddy current brakes, or any other braking mechanism can be utilized.

Figure 3:
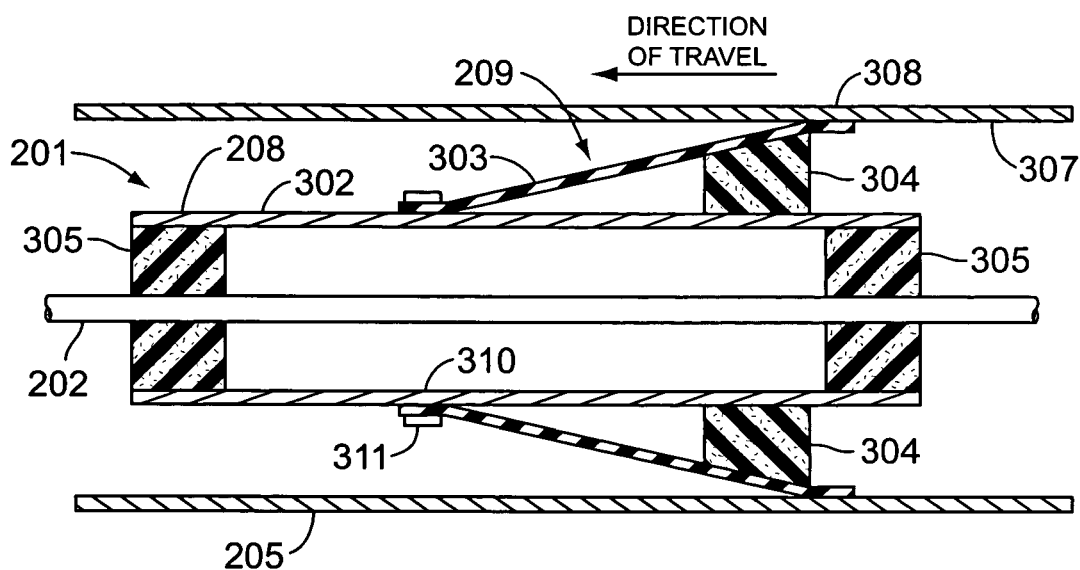
FIG. 3 shows a side view of a sliding pipe plug according to some embodiments of the present invention.
Figure 4:
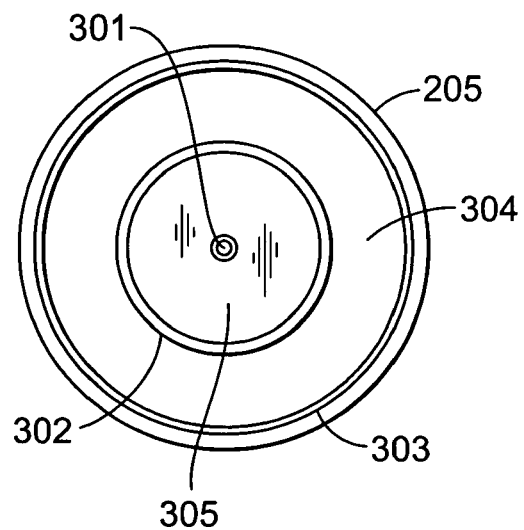
FIG. 4 shows an end view of a sliding pipe plug according to some embodiments of the present invention.

FIGS. 3 and 4 illustrate an embodiment of a sliding pipe plug 201 according to the present invention. As shown in FIGS. 2A and 2B, embodiments of sliding pipe plug 201 travel through pipe section 205 when pulled along by cable 202. Cable 202 may house electrical signal lines from sonde 203 (FIG. 2A), as well as provide the mechanical strength to slide apparatus 201 and sonde 203 though section 205.

Sliding pipe plug 201 includes a central portion 208 which is attached to cable 202. Gasket 209 is attached to central portion 208 and forms a seal with the inner wall of pipe 205 as sliding pipe plug 201 is towed through pipe section 205. Central portion 208 can include section 302 and end-caps 305. Section 302 may be, for example, a section of pipe smaller in diameter than pipe section 205. In some embodiments, section 302 has a diameter large enough to allow sonde 203 to pass through section 302.

End-caps 305 attach to section 302 and firmly hold cable 202 when apparatus 201 is attached to cable 202. Sliding pipe plug 201, then, is firmly attached to cable 202 by end-caps 305 at each end of section 302 with sufficient force to allow cable 202 to be used to pull sliding pipe plug 201 through the pipe section 205 along with cable 202. In some embodiments, end-caps 305 attach around cable 202 on both ends of center 302. In some embodiments, for example where all of the electronics is housed within center portion 208, end-cap 305 is only utilized on the end where cable 202 enters center portion 208 and the opposite end of center 302 is sealed, for example with a cap permanently attached to center 302.

Gasket 303, a conical section in this embodiment, attaches to section 302 of center portion 208 at point 310. Gasket 303 may be made from rubber sheet. Gasket 303 engages inner surface 307 of pipe 306 at point 308. In some embodiments, the gasket is sufficiently flexible to allow sliding pipe plug 201 to slide past minor obstructions in the pipe such as root intrusions, offset pipe joints and connection misalignments while substantially sealing against the side wall of the pipe.

Gasket support 304 can be made of a flexible material such as closed-cell foam rubber, providing the support to substantially seal gasket 303 against the inner surface 307 of pipe 306 but also soft enough to allow for deformation of gasket 303 as necessary to bypass obstructions along the inside of pipe section 205. Gasket 303 may be firmly attached to section 302 with, for example, a hose clamp 311. In some embodiments, gasket 303 may be permanently attached to section 302 by epoxy or glue. End-caps 305 in central portion 302 may, for example, include closed-cell foam rubber in order to seal and attach to cable 202. Central portion 302 may be formed of solid material, for example PVC pipe, steel, aluminum or any other rigid material.

Figure 8A:
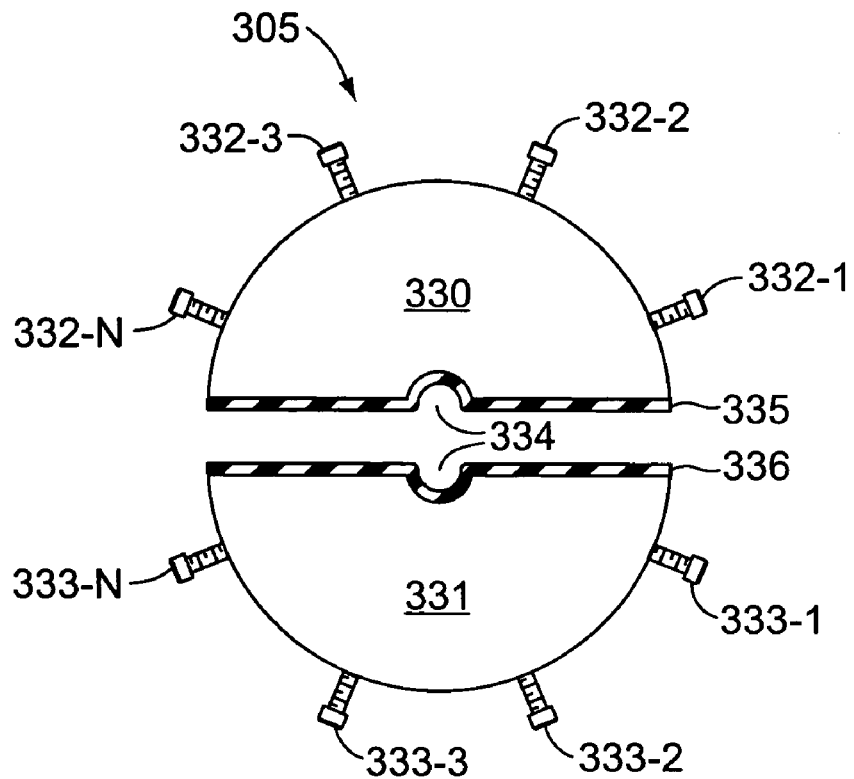
FIGS. 8A, 8B, 8C and 8D illustrate methods of attaching a sliding pipe plug according to the present invention to a cable or pipe.
Figure 8B:
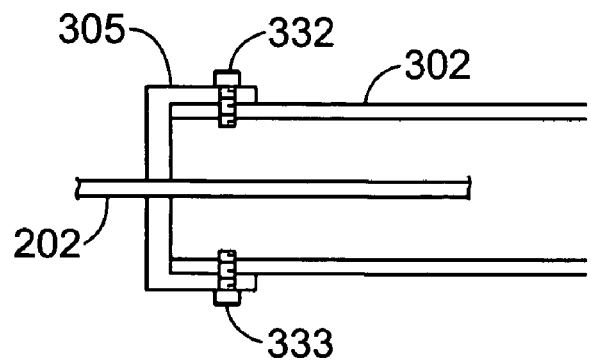

FIGS. 8A and 8B show an embodiment of end-cap 305. The embodiment of end-cap 305 includes two separated pieces 330 and 331. In some embodiments, a PVC end cap that fits on the PVC pipe that forms center 302 may be split in half to form pieces 330 and 331. An access 334 for passage of cable 202 is formed in the center of pieces 330 and 331. Further, access 334 and the pieces 330 and 331 may be lined with a gasket material 335 and 336, respectively, so that, when assembled, a seal is made between end-cap 305 and cable 202. Gasket materials 335 and 336 may, for example, be a closed-cell foam rubber. FIG. 8B shows the assembled end cap, which is placed around cable 202 and screwed with screws 332 and 333 into center 302. There may be any number of screws available to hold parts 330 and 331 to center 302, for example screws 332-1 through 332-N and 333-1 through 333-N are shown in FIG. 8A. By tightening screws 332 and 333, sliding pipe plug 201 is firmly attached and sealed to cable 202.

Any mechanism for attaching end-caps 305 to center 302 firmly around cable 202 can be utilized. One skilled in the art will recognize various quick-clip mechanisms or attachment mechanisms which will function to attach pieces 330 and 331 to center 302 in addition to the screws that are explicitly shown here.

Figure 8C:
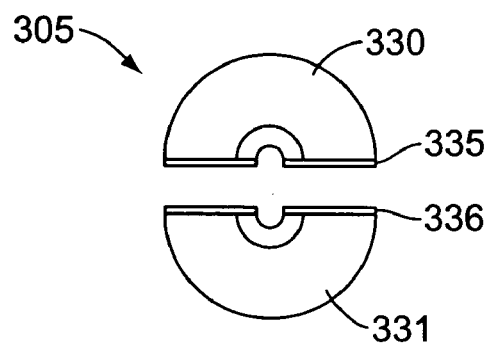
Figure 8D:
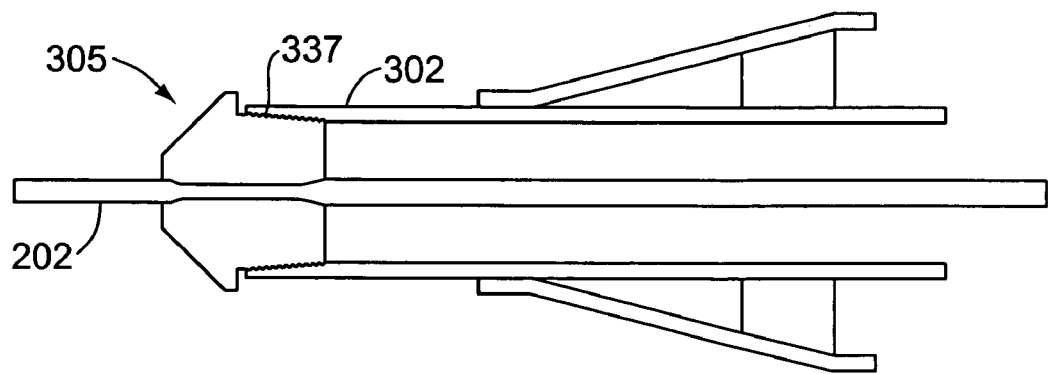

As another example, FIGS. 8C and 8D show another embodiment of end-cap 305. In some embodiments, parts 301 and 302 may be lined with gasket materials 335 and 336, respectively, As shown in FIGS. 8C and 8D, pieces 301 and 302 are formed to screw into center 302. In some embodiments, engaging tapered threads 337 are utilized so that end-cap 305 clamps onto cable 202 as it is screwed into center 302. In this example, end-cap 305 may be machined from a hard plastic material to fit into a PVC or metal pipe.

Note that neither gasket 303 nor end-caps 305 are required to completely seal against water flow through pipe-section 205. In the application of FELL testing, sliding pipe plug 201 only needs to keep a sufficient level of water over sonde 203 to perform the FELL test. Leak-by of water during the process may be possible. In some embodiments of the invention, however, which may be utilized in other applications, a higher level of seal may be needed. Further, sliding pipe plug 201 can be adapted to any combination of the size of pipe section 205 and cable 202, which is insertable into pipe section 205. In some embodiments, cable 202 may be replaced by a pipe or tubing where sliding pipe plug 201 is attached to the pipe or tubing in the same fashion as it is attached to cable 202.

As an example, an embodiment of sliding pipe plug 201 adapted for FELL testing of a 6 inch sewage pipe is formed with 3 inch PVC pipe 11 inches long as central portion 302. Gasket 303 forms a 6-inch conical gasket from sheet rubber and is attached along the 3-inch PVC pipe with hose clamps appropriate for 3-inch PVC pipe. End-caps 305 are 3-inch PVC pipe caps split along the center, with an access appropriate to cable 202 and lined with closed-cell foam rubber. Multiple screws are utilized to attach end-caps 305 to center part 302 of center 208. Sliding pipe plug 201, then, is attached to cable 201 with sonde 203 by removing end-caps 305, passing sonde 203 through center 302, and attaching end-caps 305 to center 302 in order to mechanically grip cable 202 with end-caps 305 and substantially provide a water seal around cable 202.

Figure 5A:
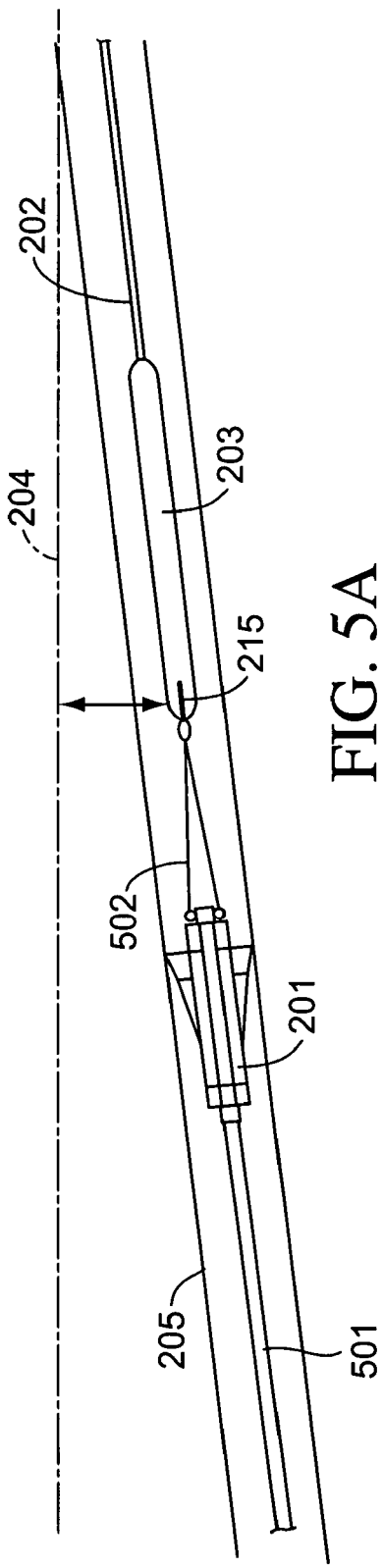
FIGS. 5A, 5B, and 5C illustrate a FELL test according to some embodiments of the present invention.

FIG. 5A illustrates another way of utilizing an embodiment of sliding pipe plug 201 according to the present invention. As shown in FIG. 5A, sliding pipe plug is attached to hose 501. In some embodiments, hose 501 may be a separate tow cable. In some embodiments, hose 501 is a high-pressure hose which has traveled through pipe section 205 during, for example, a high-pressure cleaning process. Sonde 203, which is coupled to sonde cable 202, is attached to sliding pipe plug 201 such that sonde 203 and sonde cable 202 are towed through pipe section 205 by hose 501. Sonde 203 can include a pressure transducer 215 to monitor water pressure at sonde 203. In some embodiments, water can be added to pipe section 205 through hose 501, which will eject water on the side of sliding pipe plug 201 that includes sonde 203, in order to maintain water level 204 relative to sonde 203.

Figure 5B:
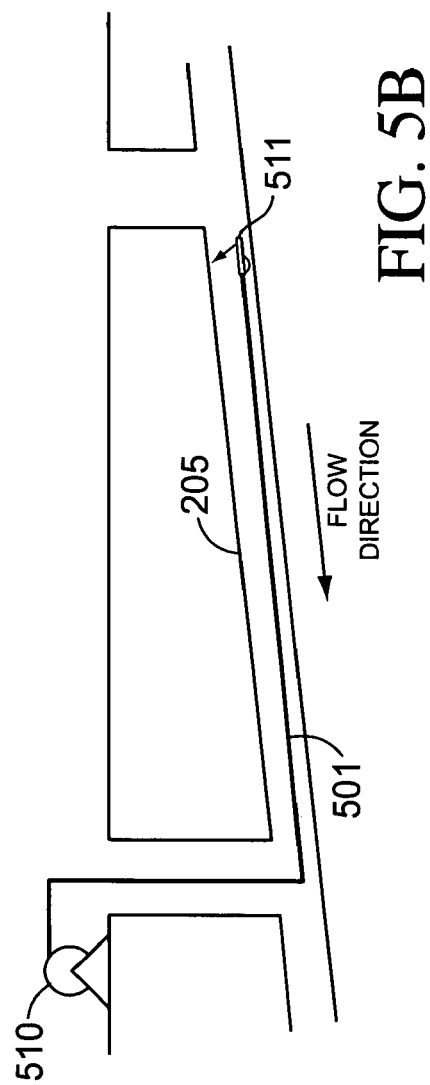

FIG. 5B illustrates a typical high-pressure cleaning process through pipe section 205. High-pressure hose 501 is attached to a high-pressure nozzle 511. High pressure nozzle 511 directs water in the flow direction of the pipe. As a result of the pressure of the water dispensed, nozzle 511 is propelled through pipe section 205 during the cleaning process. As nozzle 511 is propelled through pipe section 205, high-pressure hose 501 is towed from a winch 510 through pipe section 205.

Figure 5C:
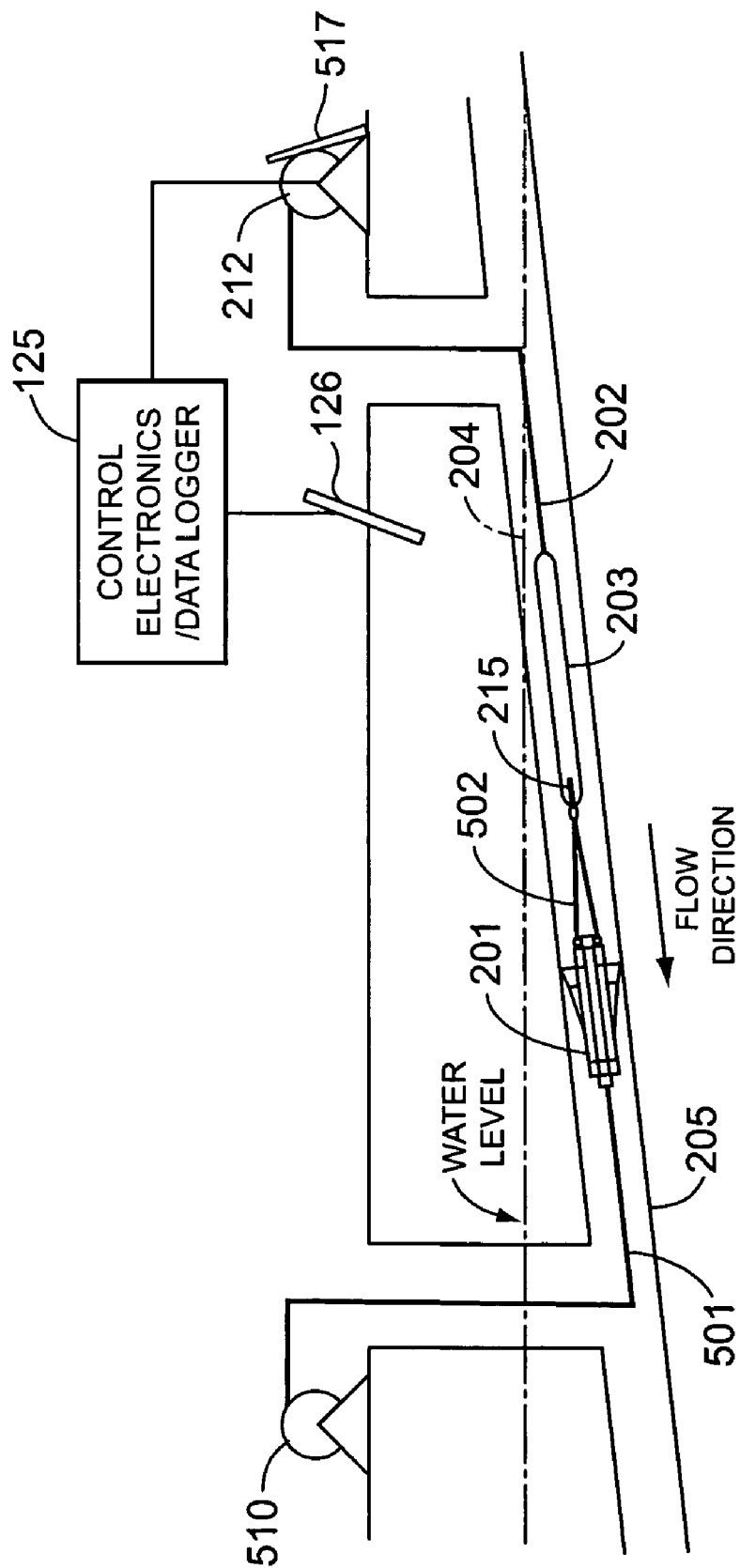

FIG. 5C shows an embodiment of a method of sonde testing according to the present invention utilizing high-pressure hose 501, sliding pipe plug 201, sonde 203, and sonde cable 202 through pipe section 205. Once nozzle 511 has towed high-pressure hose 501 through pipe section 205, nozzle 511 can be removed from high pressure hose 501 and sliding pipe plug 201 can be attached to high-pressure hose 501. In some embodiments, nozzle 511 is removed from high pressures hose 501 and sliding pipe plug 201 is attached to hose 501 in place of nozzle 511.

Sonde 203 is attached to sliding pipe plug 201 with attachment 502. Attachment 502 can be a separate tow cable coupled between sliding pipe plug 201 and sonde 203. The water level in pipe 205 is brought to a height that is sufficient to cover the sonde to carry out the FELL test. High pressure hose 501 is then pulled back through pipe section 205 by winch 510. Sonde 203 and sonde cable 202 are towed through pipe section 205 along with sliding pipe plug 201. As illustrated in FIG. 5C, winch 212, which is coupled to sonde cable 202, allows cable 202 to be pulled out during the FELL testing, as opposed to towing sonde 203 through pipe section 205 as was illustrated in FIGS. 2A and 2B. A brake 517 on winch 212 can, as with brake 216 shown in FIG. 2B, control the speed of sonde 203 through pipe section 205. Brake 516 can, for example, be any of the mechanisms discussed with regard to brake 217 of FIG. 2B.

Data is logged and evaluated in control electronics 125 as has been previously discussed. In some embodiments, water can be kept at a constant level above sonde 203 by adding water through high-pressure hose 501. Pressure sensor 215 can be monitored to indicate the need for more water and to indicate the presence of a leak.

In some embodiments, pressure sensor 215 can be utilized to ensure that sliding pipe plug 201 is holding back sufficient water to perform the test, for example a sonde test. Further, pressure sensor 215 can be monitored to ensure that the sliding pipe plug does not hold back too much water, backing water into services connected to the sewer pipe section 105. Additionally, pressure sensor 215 can be monitored to indicate leaks in pipe section 105.

Figure 6:
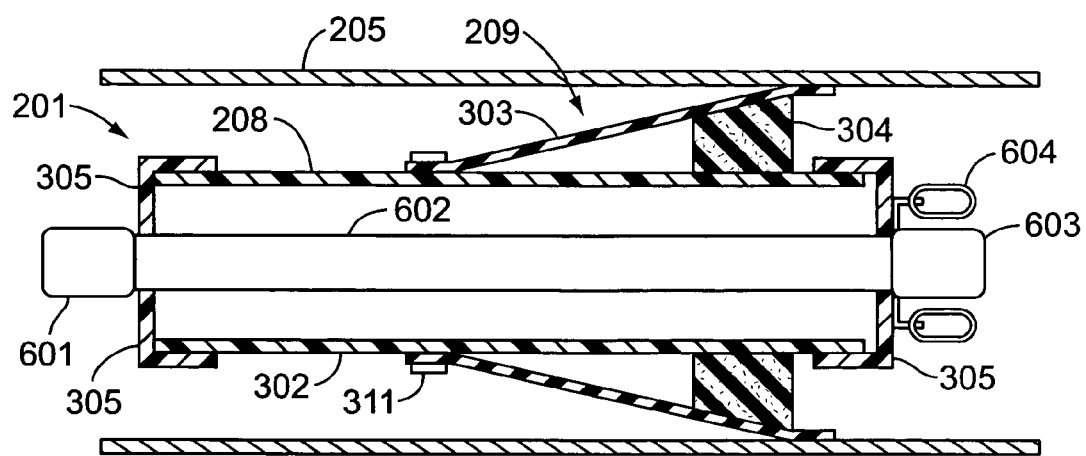
FIG. 6 shows a side view of a sliding pipe plug according to some embodiments of the present invention.
Figure 7:
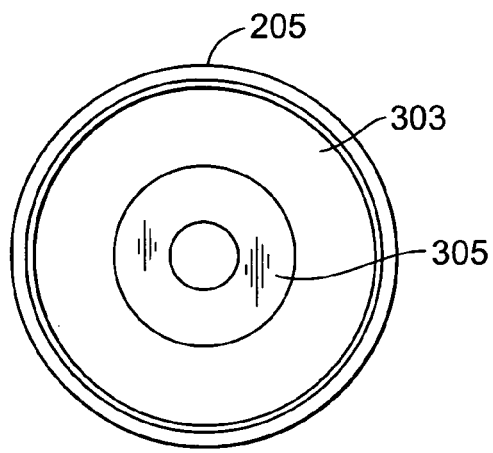
FIG. 7 shows an end view of a sliding pipe plug according to some embodiments of the present invention.

FIGS. 6 and 7 illustrate an embodiment of sliding pipe plug 201 which can be utilized with hose 501 as illustrated in FIGS. 5A, 5B and 5C. Again, sliding pipe plug 201 includes center portion 208 and gasket 209. As discussed before, gasket 209 can be formed from sheet rubber and attached to center portion 208 with a hose clamp 311 or other attachment mechanism. Spacers 304 insure that gasket material 303 is flush against the inside wall of pipe section 205 so that when water is introduced into the pipe, gasket 303 is in position to substantially seal pipe section 205, especially with the help of water pressure pushing against pipe gasket 303. Center portion 208 includes center material 302, which can be a length of PVC pipe, and end-caps 305. End-caps 305, as discussed with respect to FIGS. 8A, 8B, 8C and 8D, can be split and, when assembled, attach and seal against a pipe or cable. As shown in FIG. 6, end-caps 305 attach and seal against pipe 602. Since pipe 602 is, in this embodiment, a permanent part of center section 208, end-caps 305 need not be split as shown in FIGS. 8A and 8C. Instead, end-caps 305 can be PVC caps appropriately sized for center material 302 which allows pipe 602 to pass. A gasket material formed around pipe 602 can be utilized to seal end-caps 305 with pipe 602. Further, end-caps 305 can be, for example, attached to center material 302 with PVC glue. Connectors 601 and 603 can be attached to pipe 602 and can provide further mechanical stability and be used to provide sealing against end-caps 305. In some embodiments, pipe 602 and connectors 601 and 602 can be steel pipe appropriate for receiving high-pressure hose 501. Shackle 604 is provided to attach the sliding pipe plug to sonde 203. In one embodiment, ½ inch high-pressure pipe and pipe-fittings can be utilized for pipe 602 and connectors 601 and 602, respectively. FIG. 7 shows a cross section down pipe section 302.

Figure 9:
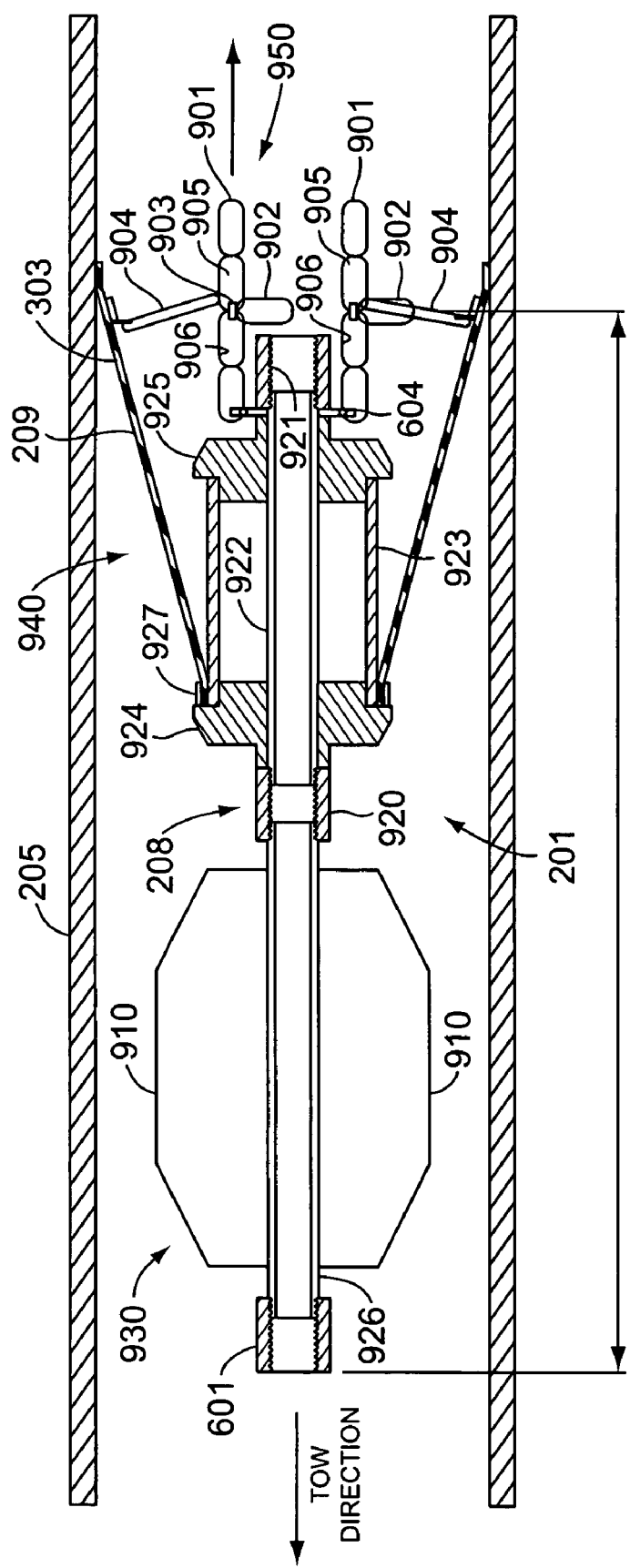
FIG. 9 shows an embodiment of sliding pipe plug according to the present invention capable of collapsing the gasket so that water will flow past the sliding pipe plug and the sliding pipe plug can be towed through the pipe in a direction opposite the natural flow of water in the pipe.

FIG. 9 shows another embodiment of sliding pipe plug 201 according to the present invention. In the embodiment of sliding pipe plug 201 shown in FIG. 9, central portion 208 is formed from a centralizing section 930 and a plug section 940. Centralizing section 930 can include centralizing fins 910. As shown in FIG. 9, centralizing fins 910 can be attached to a pipe section 926. Connector 601 can be coupled with pipe section 926 in order to couple pipe section 926 with high pressure hose 501 or other haul line.

As sliding pipe plug 201 is being towed along pipe section 205 by haul line 501, centralizing section 930 helps to keep sliding pipe plug 201 near the center of pipe section 205 so that the seal between gasket 209 and pipe section 205 is not broken and to keep the downstream end of sliding pipe plug 201 clear of obstructions in pipe section 205.

In some embodiments, pipe section 926 can be a steel galvanized water pipe and centralizing fins 910 can be two or more steel plates welded edgewise onto pipe section 926. In some embodiments, pipe section 926 is a steel water pipe (for example a 1" steel water pipe) and centralizing fins 910 are steel plates (for example ⅜" steel plates) welded onto pipe section 926. However, any other rigid materials may be utilized. For example, steel rods can be welded to steel water pipe to form stabilizing fins 910. For example, pipe section 926 may be any rigid support, for example a plastic pipe, and fins 910 can be any rigid structure which extends from pipe section 926. In some embodiments, sliding pipe plug 201 is 21 inches in length and suitable for 6 inch to 12 inch ID pipe. In general, embodiments of sliding pipe plug with appropriate dimensions can be utilized in any size pipe.

Plug section 940, as shown in FIG. 9, can also be formed around a pipe section 922. Coupler 920 is attached to an end of pipe section 922 and centralizing section 930 can be coupled to plug section 940 by coupling pipe section 926 to pipe section 922 with coupler 920. A clamping section 924 is slid over pipe section 922 and abuts coupler 920. Clamping section 925, spaced from clamping section 924 with spacer 923, is then slid over pipe section 922. A second coupler 921 is attached to pipe section 922 to tighten coupler 925 and spacer 923 against clamping section 924. Clamping section 924 is shaped so as to receive gasket material 303 of gasket 209 and clamp gasket material 303 firmly in place when couplers 920 and 921 are tightened together.

As previously described, gasket 209 seals against pipe 205 and the seal is held by water pressure. In some embodiments, water can be supplied through the haul line and high pressure hose 501 attached to coupler 601.

In some embodiments, sliding pipe plug 201 includes a break-away section 950. The embodiment of break-away section shown in FIG. 9 includes chains 901 coupled to shackles 604 and links 904 coupled between chains 901 and gasket 209. In general, there can be any number of shackles 604 and therefore any number of chains 901 and links 904. For example, there may be six (6) shackles 604 coupling to six (6) chains 901 with six (6) links 904 in break-away section 950. In some embodiments, break-away section 950 can be coupled to sonde 603 through chains 901.

The embodiment of break-away section 950 shown in FIG. 9 includes links 905 and 906 coupled together with frangible link 903. Link 902 also couples between links 905 and 906 and separates links 905 and 906 when frangible link 903 is broken.

As shown in FIG. 9, sliding pipe plug 201 can be towed in a tow direction (i.e., in the direction of natural water flow in pipe section 205) by a tow line 501 (see FIG. 5C). If an attempt is made to tow sliding pipe plug 201 in the opposite direction when water flow is plugged, the pressure of water on gasket 209 is likely to jam gasket 209 against the inside surface of pipe section 205 and any obstructions on the inside surface of pipe section 205, preventing movement of sliding pipe plug 201 in the opposite direction from the tow direction. However, in some instances, especially if sliding pipe plug 201 becomes jammed while being towed in the tow direction, it is desirable to remove sliding pipe plug 201 from pipe section 205, for example by towing sonde 203 in the reverse direction from the tow direction.

As shown in FIG. 9, link 904 is coupled to a link 905 in chain 901. Link 905 can be coupled to link 906 by link 902. Additionally, link 905 may be coupled to link 902 by a frangible link 903. Frangible link 903 can be broken when a sufficient amount of tension exists in chain 901, separating links 906 and 905 by link 902. When chains 901 are lengthened by link 902, link 904 operates to pull gasket 209 away from the inner wall of pipe 205 and any trapped water is able to flow past sliding pipe plug 201 and water pressure is released from gasket 209.

In general, link 904 can be coupled to any link after frangible link 903. Link 902 can be of any length, allowing for the movement of link 904 coupled to chain 901 away from sliding pipe plug 201 by any distance. Frangible link 903 can be formed from any material or device that releases when sufficient tension is supplied along chain 901. In some embodiments, frangible link 903 can be a rubber link or plastic coupler, a plastic coupler with a deliberate fault, a tie wrap, a spot weld, or any other link with strength less than that of links 905, 906 and 902. In some embodiments, frangible link 903 is strong enough so that sonde 110 and sonde cable 202 can be towed through pipe section 205.

Figure 10:
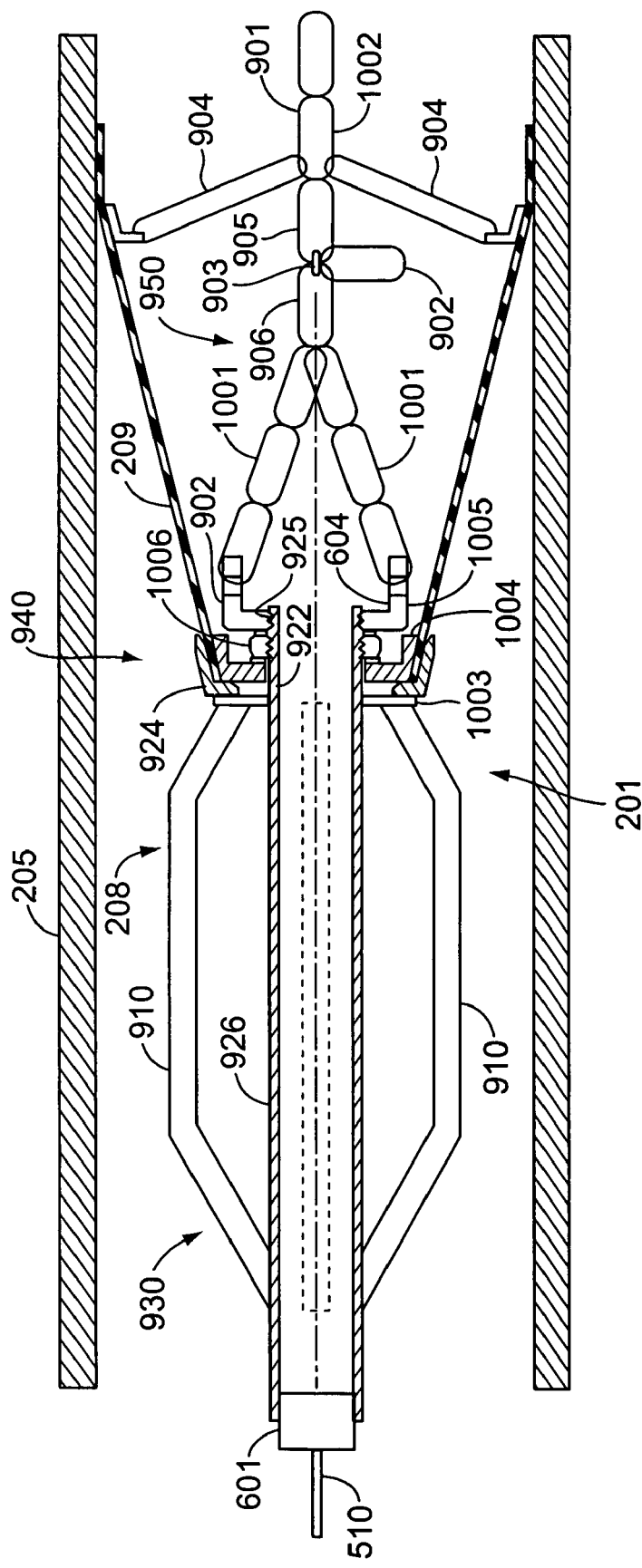
FIG. 10 shows another embodiment of a sliding pipe plug according to the present invention capable of collapsing the gasket so that water will flow past the sliding pipe plug and the sliding pipe plug can be towed through the pipe in a direction opposite the natural flow of water in the pipe.

FIG. 10 shows another embodiment of sliding pipe plug 203 according to the present invention. In the embodiment of FIG. 10, pipe sections 926 and 922 are formed from a single pipe. Haul line 501 is attached to a plug or connector 601 in pipe section 926. Centralizing fins 910, again, are attached to pipe section 926. In some embodiments, centralizing fins 910 can be attached to a support 1003 that is attached to pipe section 926. In the embodiment shown in FIG. 10, centralizing fins 910 are rods, pipes or plates and can be formed of plastic, non-corrosive aluminum, stainless steel, steel rod or other material. However, any structure which can be utilized to keep sliding pipe plug 201 essentially in the center of pipe section 205 and to help clear obstructions from sliding pipe plug 201 can be utilized.

Clamping section 924 can be attached to support 1003, which is attached to pipe section 926. In some embodiments, clamping section 924 includes a serrated inner surface and is placed over pipe section 922 next to support 1003 for centralizing fins 910. Part of gasket 209 is fitted inside clamping section 924. A clamping wedge 1004, which can have a smooth outer surface and an inside diameter that fits smoothly over pipe section 922, can be slid onto pipe section 922 and pushed against gasket 209 that is held inside clamping section 924. Clamping nut 1006 is then screwed onto threads formed on the external wall of pipe section 922 and tightened against clamping wedge 1004. The compression of gasket 209 inside clamping section 924 by clamping wedge 1004 holds gasket 209 firmly in place. A jam nut 1005 can also be screwed onto threads formed on the external wall of pipe section 922, preventing clamping nut 1006 from unscrewing. Shackles 604 can be attached to jamming nut 1005. In some embodiments, standard pipe fittings and connectors can be utilized for the components of sliding pipe plug 201.

In the embodiment of break-away section 950 shown in FIG. 10, break-away section 950 includes chain sections 1001, chain 901, and links 904. Chain sections 1001 are attached to shackles 604. In general, there can be any number of shackles 604 and chain sections 1001 arranged around pipe section 922. In the embodiment shown in FIG. 10, each of chain sections 1001 are joined at a link 906 on chain 901. As shown in FIG. 10, chain links 905 and 906 of chain 901 are joined by a frangible link 903. Link 902 is joined between links 905 and 906. Links 904 are joined between links 1002 and gasket 209. During normal operation of sliding pipe plug 201, links 904 can be slightly slack so that no force is transmitted along links 904. Sonde 203 can then be coupled to chain 901.

Figure 11:
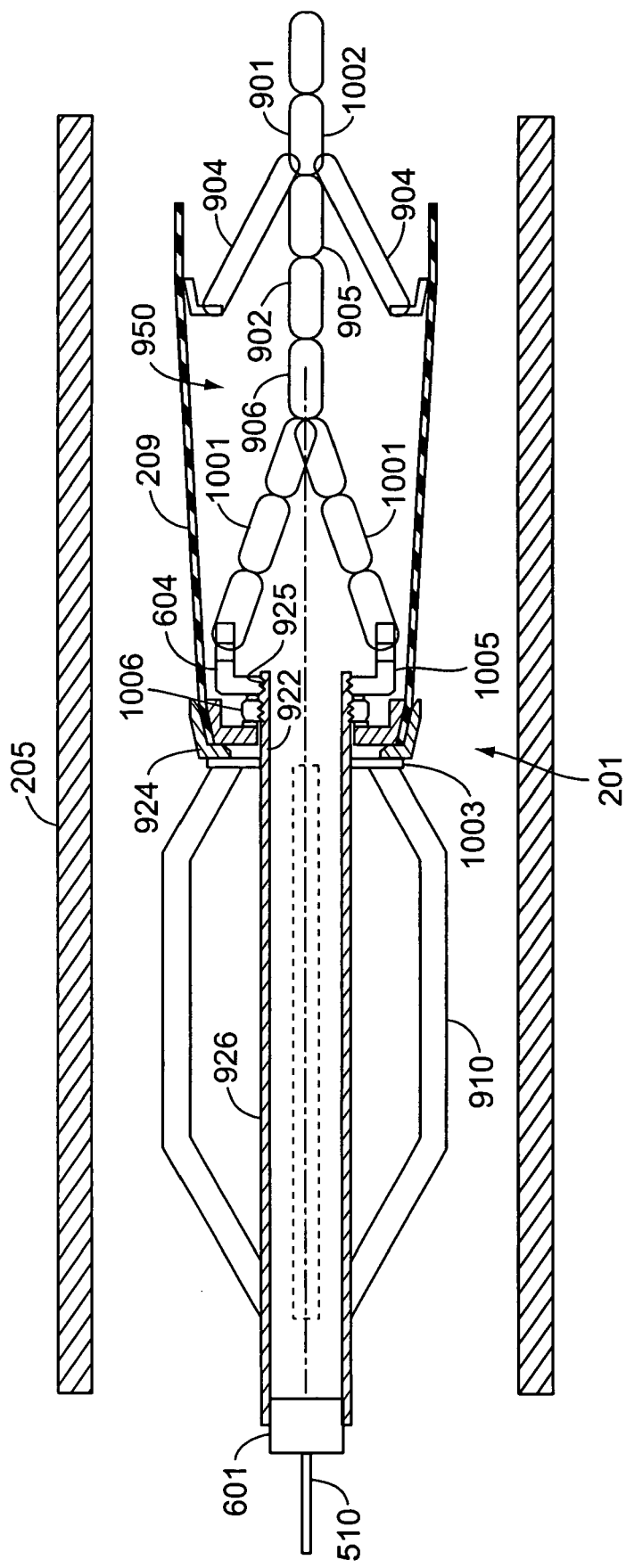
FIG. 11 shows the sliding pipe plug illustrated in FIG. 10 with the gasket collapsed.

FIG. 11 shows the embodiment of sliding pipe plug shown and discussed with FIG. 10. In FIG. 11, frangible link 903 has been broken and links 906 and 905 are now separated by link 902. The lengthening of chain 901 causes links 904, which are attached between link 1002 and gasket 209, to pull gasket 209 away from the inside wall of pipe section 205 as tension is applied to chain 901. Liquids upstream of sliding pipe plug 201 will then flow past gasket 209 and release water pressure. Sliding pipe plug 201, then, can be towed by chain 901 through the pipe without ruining or binding on gasket 209.

Although chain 901 and chain sections 1001 are shown as having particular numbers of links, any number of links can be included. Furthermore, any number of chain sections 1001 can be included. The particular combination of links 905, 906 and 902 joined with frangible link 903 can be formed anywhere in chain 901 between where chain sections 1001 are joined and where links 904 are coupled to chain section 901.

Therefore, in the embodiments of sliding pipe plug 201 shown in FIGS. 9 through 11, when sliding pipe plug 201 is jammed in towing along tow line 510, sliding pipe plug 201 can be pulled back up pipe section 205 by chain 901. To affect this, tension can be applied to chain link 901, breaking frangible link 903. Sliding pipe plug 201 can then be towed back up the pipe without gasket 209 binding or being destroyed in the process.

Embodiments of a sliding pipe plug 201 can be formed from a variety of different materials, including plastics, and metals. In general, central portion 208 can include any number of materials utilized to ultimately support gasket 209 against the inner wall of pipe section 205 and facilitate the movement of sliding pipe plug 201 in a tow direction along pipe section 205. In general, a tow line 510, which can be a high pressure water hose, is utilized to tow sliding pipe plug 201 along pipe section 205. In some embodiments a centralizing portion 930 is included to help keep sliding pipe plug 201 centered in pipe section 205. Gasket 209 is rigidly held on sliding pipe plug 201 by a clamp 924. Break-away section 950 pulls gasket 209 away from the inside wall of pipe section 205 when sliding pipe plug 201 is pulled along pipe section 205 in a direction opposite the tow direction.

One skilled in the art will recognize numerous variations and modifications to the embodiments of the invention specifically described in this disclosure. These variations and modifications are intended to be within the scope and spirit of this disclosure. The embodiments described in this disclosure are examples only of the invention and are not intended to be limiting in any way. As such, the invention is limited only by the following claims.

I claim:

1. An apparatus comprising:
   a central portion;
   a gasket portion disposed around the central portion to substantially seal against an inside wall of a pipe as the apparatus is being pulled through the pipe in a tow direction; and
   a break-away section coupled to the central portion opposite the tow direction, the break-away section including a frangible connector such that the break-away section pulls the gasket portion away from the inside wall after sufficient force opposite the tow direction is applied to the break-away section.

2. The apparatus of claim 1, wherein the gasket portion comprises a conical section gasket having a small diameter end attached to the central portion and a large diameter end substantially sealing against the inside wall of the pipe.

3. The apparatus of claim 2, wherein the conical section gasket is formed from a sheet of rubber.

4. The apparatus of claim 2, wherein water pressure is capable of assisting the seal between the conical section gasket and the inside wall of the pipe when the apparatus is being towed in the tow direction.

5. The apparatus of claim 2, wherein the gasket material is sufficiently flexible to substantially seal against the inside wall of the pipe while the apparatus is traversing obstructions in the pipe.

6. The apparatus of claim 1, further comprising a tow line, wherein the tow line is coupled to the central portion and the tow line is a cable.

7. The apparatus of claim 1, further comprising a tow line, wherein the tow line is coupled to the central portion and the tow line is a hose.

8. The apparatus of claim 1, wherein the break-away section includes a chain and a link coupled between the chain and the gasket.

9. The apparatus of claim 8, wherein the frangible connector includes two links of the chain, separated by a third link of the chain, coupled with a frangible link.

10. The apparatus of claim 1, further including a centralizing section.

11. The apparatus of claim 10, wherein the centralizing section includes fins disposed around a center to keep the apparatus substantially in the center of the pipe.

12. An apparatus, comprising:
    a central portion, the central portion including a centralizing portion and a plug portion;
    a gasket portion disposed around the central portion, the gasket portion capable of substantially sealing against an inside wall of a pipe as the apparatus is being pulled through the pipe in a tow direction by a tow line coupled to the central portion; and
    a break-away section coupled between the central portion and the gasket.

13. The apparatus of claim 12, wherein the centralizing portion includes centralizing fins radially disposed around a central axis of the plug portion.

14. The apparatus of claim 13, wherein the centralizing fins are attached to a pipe.

15. The apparatus of claim 12, wherein the break-away section includes a chain and a link coupled to the chain.

16. The apparatus of claim 15, wherein the chain includes at least one set of three links where two links of the chain, separated by a center link, can be joined by a frangible link.

17. A method of working on a pipe, comprising:
    pulling a tow apparatus through a section of pipe to be worked in a tow direction;
    attaching a sliding pipe plug to the tow apparatus, the sliding pipe plug having a central portion with a gasket disposed about the central portion;
    towing the sliding pipe plug through the pipe, wherein the sliding pipe plug substantially seals against the pipe while being towed; and
    breaking the seal against the pipe in order to pull the tow apparatus in a direction opposite the tow direction.

18. The method of claim 17, wherein the tow apparatus includes a sonde and a sonde cable.

19. The method of claim 17, wherein the tow apparatus includes a high pressure hose.

20. The method of claim 19, wherein a sonde is further attached to the sliding pipe plug opposite the high pressure hose.

21. A method of FELL testing, comprising:
    passing a haul line through a pipe section;
    attaching a sonde to the haul line, the sonde being attached to a sonde cable;
    hauling the sonde and the sonde cable through the pipe section with the haul line;
    detaching the haul line from the sonde;
    attaching a sliding pipe plug to the sonde cable;
    towing the sliding pipe plug and the sonde by the sonde cable through the pipe section in a tow direction while performing the FELL test; and
    breaking a seal against the pipe in order to pull the tow apparatus in a direction opposite the tow direction if the sliding pipe plug becomes obstructed.

22. The method of claim 21, wherein attaching the sliding pipe plug to the sonde cable comprises:
  passing the sonde through a center section of the sliding pipe plug until the center section is around the sonde cable;
  positioning pieces of the end caps around the sonde cable;
  attaching the end caps to the center section of the sliding pipe plug in order to attach and seal the sliding pipe plug to the sonde cable.

23. The method of claim 22, wherein attaching the end caps includes engaging threads on the end caps with threads in the center section of the sliding pipe plug.

24. The method of claim 23, wherein attaching the end caps includes screwing the pieces of the end caps to the center section with screws.

25. The method of claim 21, further including monitoring water pressure at the sonde while performing the sonde testing.

26. The method of claim 25, wherein a drop in water pressure is utilized to indicate a leak.

27. A method of FELL testing, comprising:
  passing a tow line through a section of pipe;
  attaching a sliding pipe plug to the tow line;
  attaching a sonde, which is attached to a sonde cable, to the sliding pipe plug opposite the tow line;
  performing a FELL test while towing the sliding pipe plug through the section of pipe by the tow line, wherein the sliding pipe plug substantially seals the pipe while being towed by the tow line.

28. The method of claim 27, wherein the tow line is a hose.

29. The method of claim 28, wherein passing the tow line through the section of pipe includes pressure cleaning the section of pipe wherein a high-pressure nozzle attached to the hose is propelled through the section of pipe by the high-pressure water of the pressure cleaning.

30. The method of claim 28, wherein attaching the sliding pipe plug includes connecting the high-pressure hose to a pipe connector on a center portion of the sliding pipe plug.

31. The method of claim 28, wherein the hose supplies water to cover the sonde.

32. The method of claim 27, further including monitoring pressure at the sonde while performing the FELL test.

33. The method of claim 32, wherein a drop in pressure at the sonde is utilized to indicate a leak.

34. The method of claim 27, wherein towing the sliding pipe plug through the section of pipe with a tow line includes controlling the velocity of the sliding pipe plug through the section of pipe with a brake.

35. An apparatus comprising:
  a central portion;
  a gasket portion disposed around the central portion to substantially seal against an inside wall of a pipe as the apparatus is being pulled through the pipe in a tow direction; and
  a break-away section coupled between the central portion and the gasket.

* * * * *